United States Patent Office 3,087,254
Patented Apr. 30, 1963

3,087,254
METHOD AND APPARATUS FOR DRYING SOLVENT-CONTAINING MATERIALS WHILE RECOVERING VAPORIZED SOLVENT
Hisayoshi Kubodera, Mita Tokyu Apt. No. 1—1, Shiba Mita Kouncho, Minato-ku, Tokyo, Japan
Filed Feb. 4, 1960, Ser. No. 6,757
Claims priority, application Japan Oct. 1, 1959
5 Claims. (Cl. 34—16)

The present invention relates to a method and apparatus for drying solvent-containing materials while recovering the vaporized solvent.

The solvent-containing material to be treated is passed upwardly through a dry air current in a drying tower, while the air in the tower moves downwardly. Thus the solvent contained in the raw material is vaporized. The solvent vapor is condensed when the air, which had been used for the above drying operation, is cooled by means of cooling equipment. The recovered air is heated again and returned to the upper section of the drying tower. Of the circulating air, some air of less drying capacity which contains an excessive quantity of the solvent vapor, is pressurized by a blower. This pressurized air is injected against the material rising from the lower inlet of the drying tower. Then the air, which has become heavy due to the large accumulation of solvent vapor and cooling thereof in the drying tower, is driven to the upper section of the drying tower by the above injected air. At the same time, the injected air forms an air film on both sides of the material at the surface of the inlet. This air film prevents the air in the drying tower from flowing through the material inlet to the outside.

In general, methyl alcohol is used as the solvent and although its molecular weight is small, its vapor is heavier than the air. Hence, a device quite different from that of the conventional vaporization of water which has a specific gravity about half as much as the air, must be employed in drying the solvent-containing material. In this connection, it should satisfy the following requirements:

(1) The operation should be easily and effectively conducted.
(2) Products of high quality should be obtained.
(3) Solvent should be recovered easily and effectively (a device requiring complicated equipment and operation is not economically justified, even if it is effective, or the solvent used is expensive).
(4) Even a small quantity of solvent should not be released uselessly to the atmosphere, as the solvents have generally an offensive odor, and some of them are poisonous.
(5) As there is a danger of the combustive solvent exploding, when its vapor is mixed with air, preventive measure should be taken against such an explosion.

The method and apparatus according to this invention satisfies the above requirements. The equipment is extremely effective and simple. The space required for the operation is small, while operation and control is easy. Furthermore, the power and heat input required for the operation are small. Meanwhile, as the same air is recycled, there is little entry of undesired air and no contamination of the air employed. The solvent vapor is cooled and can be separated and recovered by water products of uniform and excellent quality can be made throughout the year.

The invention is further described in reference to the accompanying drawings in which.

Figure 1:
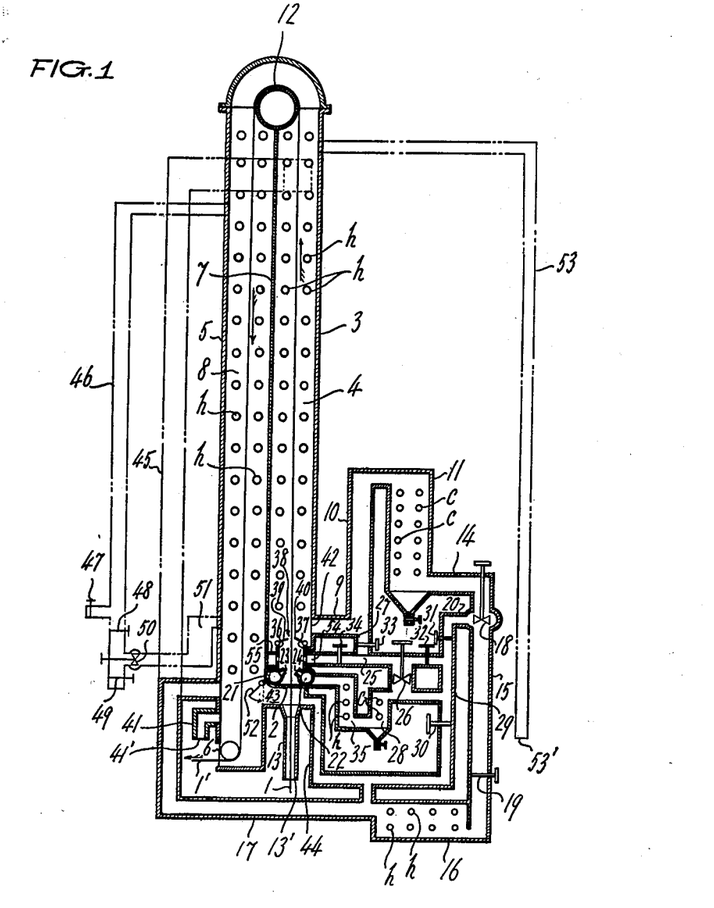
FIG. 1 is a cross-sectional view of the apparatus diagrammatically according to this invention.

In connection with the diagrammatic system of the method and apparatus according to this invention, an example of the practice is given hereunder:

The solvent-containing raw material 1 to be treated (which shall hereinafter be termed "raw material" in short) is led from the material inlet 13 just under the drying tower 3, and pushed up through the drying chamber 4 from the material feeder 2 under the drying tower 3. Then the material passes through the adjacent finish-drying tower 5 by way of the roller 12. After that, the material is product 1', which is taken out of the material outlet 6 at the bottom of the drying tower. The drying tower 3 is sometimes separated from the finish-drying tower 5. As shown in the figure it is also possible that a single tower is divided by a vertical partition wall 7, which separates the drying chamber 4 from the finish-drying chamber 8. The air for the drying use, a carrying medium of the heat and vapor drops in the drying chamber 4 of the drying tower 3. Containing a large quantity of solvent vapor, the air enters the solvent recovery tower 11 through the connecting tube 9 at the connecting passage 42 under the drying tower 3, and through the connecting tube 10. When the air is cooled in the recovery tower, most of the solvent vapor content is condensed separated and recovered. The air flows through the passages 14 and 15 connecting with the recovery tower 11, and is heated in the preheater 16. Then the air enters the lower section of the finish-drying tower 5 through the connecting passage 17. After being passed up through the chamber 8, the air recycled to the upper section of the adjacent drying tower 3.

The solvent vapor, which had been evaporated in the chamber 4 of the drying tower 3, is heavier than the air, and is further cooled by the latent heat of the evaporation. With the increase of the weight, therefore, the vapor quickly drops in the chamber. The air including this vapor, i.e. the air in the drying chamber 4 becomes so much heavier than the air tends to pass through material inlet 2 of the bottom of the drying tower 3. By utilizing an arrangement, almost all the solvent vapor, which is vaporized by means of the drying operation, can be recovered in the solvent recovery tower 11, as the same air can be used, by circulation and the air in the equipment is not released to the outside, even if the outlet 6 of the product 1' is kept open to the open air. As the subterranean water is used in the cooling operation for the recovery and separation of solvent, the vapor containing the solvent, whose saturation point is almost the temperature of the underground water, is heated, given a considerable drying capacity and sent to the finish-drying chamber 8. The solvent content of the product 1' is accordingly very small in quantity. As such a small amount of the solvent content is immediately released to the open air, no trouble is generally caused. The solvent vaporizes from the material 1, and then the quantity of the solvent vapor mixed in the air gradually increases, while the quantity of the solvent in the material 1 gradually decreases with the flow of the air. Therefore, the solvent content of the air and the material is smaller in the upper section of the drying chamber 4, while it is larger in the lower section. Therefore, the evaporation of the solvent from the material, i.e. the drying of the material 1 is gradually and uniformly conducted over the whole arrangement in the drying tower 3. The product has no distortion. If the solvent content of the material is not uniform, the material containing large amount of the solvent is tardy in evaporation. However, as the evaporated vapor is heavy, it immediately descends to the lower section, where the nearby air of powerful drying capacity promotes the evaporation. Thus uniform drying can be conducted, while the drying efficiency can be enhanced. Products of excellent quality can be obtained. The excellent drying process meeting the above drying theory is caused by the spontaneous flow of the drying air. In order to promote this effective process and increase the drying capacity, a blower 18 is sometimes placed in the circulation passage. For the purpose of adjusting this acceleration effect, it would be more favorable to set a valve 19 in the connecting tube 15.

The air flowing from the drying tower 3 to the cooling tower 11 is kept saturated at the temperature, until the solvent vapor is condensed and liquefied on the bottom of the tower and in the inner wall of the connecting tubes 9 and 10, and flows out or the air is kept supersaturated to the maximum point, when the solvent vapor becomes so much that the air loses its drying capacity. Thus the too rapid drying of the freshly introduced material 1 can be prevented. Furthermore, the use of the cooling water for the recovery of solvent can be reduced or effectively made. However, if the solvent vapor, which had evaporated from the material in the drying tower, is cooled by the latent heat of the evaporation, and is allowed to quickly descend along the surface of the material 1 rising through the drying chamber, as the weight of the vapor is increased, the solvent is condensed on the surface of the material 1 in the lower part of the drying chamber 4, as the material is not yet heated and under the low temperature condition. Not only that, the solvent stains the surface, while it enters the material inlet 2, on whose inner surface it congeals and drops. In order to prevent these defects, some of the circulating air for the drying use is pressed by a blower and injected against the whole surface of the material 1 ascending at the material inlet 2 of the drying tower 3. Thus the air, which is supersaturated with solvent vapor, is driven to the upper section of the drying chamber. At the same time, an air film is formed by the driven air to prevent the air in the drying chamber from running out of the material inlet 2 to the outside. All the air, which had been used for the drying operation, is charged into the solvent recovery tower 11 so that almost all of the solvent, which had been vaporized in the drying process may be separated and recovered. This isolating effect of the drying gas from the open air by means of the formation of an air film is the essentials of this invention. The injection must be so designed that the above drying effect may be promoted.

As the air coming from the solvent recovery tower 11 is saturated with the solvent vapor at a temperature, somewhat higher than that of the cooling water, the temperature of the air is generally a little lower than the temperature of the material inlet 2. Though the temperature increases to the temperature within the inlet 2 so that some drying capacity is caused, a slight drying action mostly brings a good effect, as the quantity of the air is small. Thus no serious trouble is caused generally. In this case, even if another blower is used as a power source for the wind pressure, the drying power would be enough, when the blower 18 for circulating the drying air is branched. Meanwhile, if it is designed that the powerfully compressed air accelerated by the centrifugal force of the blower 18 is released, the air is taken through the passage 20 as shown in the figure, and the powerfully compressed air can be distributed favorably. In the chamber of the lower inlet 2 of the drying chamber 4, there are the tubes 21 and 22 connecting with the above passage 20 at both sides of the inlet 2. These tubes are equipped with the feeding beaks 23 and 24. The air coming from these beaks 23 and 24 is taken off from the upper side of the beaks, and is circulated by the blower 26 in the inlet 2 of the material by the way of the passage 25 connecting with the passages 55 and 54 around the outside of the sections 36 and 37. The temperature of the air is constant. Not only that, the air has no drying capacity, as it is saturated with the solvent vapor. However, the air is not powerful enough to drive into the inside of drying chamber the heavy solvent vapor, which descends along the surface of the material coming up from the material inlet 2. It is, therefore, desirable to mix the air coming from the solvent recovery tower 11 through the connecting tube 14, in order to support the above driving effect. Meanwhile, the high-temperature air including a large amount of the solvent flowing out of the drying chamber 4 is introduced from the connecting tube 9 at the passage 27. If the above air is driven by the blower 26 and cooled to the moderate temperature in a small-sized cooler 28 connecting with the blower to congeal and separate the solvent, a saturated air can be obtained at the desired temperature. According to circumstances, the air, from which the solvent had been recovered, can be heated in the preheater 16 to obtain the drying capacity and be branched off from the passage 29 for the re-use purpose. Meanwhile, if the above passage 29 is suitably combined with the valves 30, 31, 33, 34, etc., in operation, the air meeting requirement can be obtained, while the driving speed can be suitably regulated. Aside from that, it is also possible that the driven air should be heated in a small-sized heater 35 to increase the drying capacity. In a special case when the surface of the solvent-containing material 1 should be rapidly and slightly dried prior to the drying of the drying chamber 4, the air can be highly cooled in a small-sized cooler 28 to remove the solvent, and further be heated in a small-sized heater 35 to be driven for the re-use.

The driven air forms an air film at right or similar-to-right angles to the direction of the material 1. It is desirable that the formed air film isolates the inner and outer sides from each other. In order to reduce troubles as much as possible to drive the air, which includes a large amount of the solvent vapor rapidly descending along the surface of the material 1 at the material inlet 2, it is a proper method to drive the air upwards, by regulating its direction. Thus the air coming from the upper section of the equipment can be checked with safety, while the downward branching of the driven air as well as the mixing of the open air can be prevented. For this purpose, it is important that the feeding beaks 23 and 24 should be set at suitable angles at the pivot of the beak tubes 21 and 22. The most suitable angle, however, varies with the velocity of the ascending material 1, its surface condition, the velocity of the driven air, pressure difference between the in- and outside of the material inlet 2, the difference between the material-containing part and non-material part on the center as in case of the band film and fibre bundle, etc. In practice, therefore, these beaks should be regulated to the most suitable position. Meanwhile, in the chamber section of both sides of the material 1, there is no danger of the air being disturbed, as the driven air unites in the center and ascends, forming a streamline flow.

The driven air must be as small in pressure and quantity as possible, not to obstruct the good drying effect, but to promote this effect. In this connection, it is desirable that the outlet of the feeding beaks 23 and 24 should be as narrow as possible, and that the edge of this narrow opening should be linear and its breadth should be the same over both sides. This narrow opening can be used for a long time, as it is hardly contaminated or choked with dust and other strange matter, when the circulating branched drying air goes in and out from this opening. In case only one side of the material 1 is painted, the air should be driven against the painted side alone, the back side of the material being kept in contact with the rear side of the material inlet 2. It would be effective, if the feed beaks 23 and 24 should be close to the material 1. If so, less air is introduced and mixed. It is more reasonable that these beaks can be moved back as occasion demands, for example when the material is introduced for the first time. Meanwhile, it is desirable that the opening 38 of the upper end of the introducing inlet sections 36 and 37 of the material inlet 2 of the material 1 to the drying tower 3 should be narrow to enhance the effect of the driven air. Alike in case of the feed beaks 23 and 24, the shield plates 39 and 40 are laid so that the opening may be extended as occasion demands. Thus the whole amount of the air, which had been used for the drying process, can easily and safely be sent to the solvent recovery tower 11. It is, however, a complicated operation to regulate the direction of the driven air in according with the operation so properly that the whole quantity of the driven air may be introduced into the equipment, and that the open air may not be induced from the outside and not be mixed. Though it is difficult to achieve the completeness of the above operation, it is possible to control the quantity to the minimum. After all, the mixed air is saturated with the solvent vapor, which had been cooled in the solvent recovery tower 11, and runs over the outlet of the product 1' to the outside. It then carries away an extremely small quantity of the solvent.

All the elements such as the passages, towers, vessels, etc. for the circulating air are perfectly isolated from the open air, while the inlet of the material is shielded by the air so that an extremely small quantity of open air is included. Therefore, if the air within the elements is heated and expanded, or another gas which could not be condensed and separated in the cooling recovery tower is formed within the inside, the air, together with the gas, runs over the inlet 6, the only opened inlet of the material. If an exhaust tube 41 for this overflowing air is set on a position a little higher than this inlet 6, while an inlet for the circulating preheated air is introduced at a point higher than the level of the overflow port 41' of the above exhaust tube 41, not only no disturbance is caused but also the air can spontaneously be exhausted to the outside without any adjustment.

If a passage 43 connecting with the finish-drying tower 5 is laid on the lower part of the material inlet 2 of the material 1, while another tube 44 connecting with the preheated air passage is laid on the above part, the original effect can be achieved by the circulation of constant volume of the same air in the equipment and the material outlet to the drying tower can favorably be blocked, because the passage of the air relates to only the preheated circulating air, not to the air in the outside of the equipment, even if much air is introduced from the lower part or some of the driven air flows to the lower part, due to the misadjustment of the direction of the driven air from the feed beaks 23 and 24. In this case, the passage of the material 1 to the feed beaks 23 and 24 is isolated from the open air by the surrounding wall. If the lower end 13' of the lower lead port 13 is placed at a position lower than the outlet 6 of the product 1', the circulating preheated air cannot flow out, even if the lower end 13' is kept open to the outside air. As the air, which had recovered the solvent in the cooling process, is saturated with the solvent vapor, the air is heated and made lighter than the open air, so that it may not descend to the opened outlet 6 of the product 1' and to the inlet 2 of the material 1.

In general, the higher the drying tower 3, the longer the drying process becomes with the increase of the drying capacity. In addition, the drying capacity is increased, as the velocity of descending air in the drying chamber 4 is promoted by the weight of solvent vapor. In the meantime, the vertical drying tower based upon this method is characterized by the following effects: The air in contact with the material 1, whose solvent content is ununiform and which is tardy in evaporation due to the large quantity of the solvent content, becomes heavy after the absorption of solvent vapor, and consequently descends and promotes the evaporation. Meanwhile, a uniform effect can be expected, because a well-balanced drying capacity is available on the same level, as the air rapidly descends immediately after its having absorbed a large quantity of solvent vapor, even if the solvent vapor and the air are on the same temperature level, The product 1' coming from the finish-drying tower 5 has separated from it the most part of the solvent in the tower, and goes ahead. Even though the product has, therefore, a small quantity of solvent vapor, it is released immediately after its coming from the outlet 6 into contact with the open air. If the plastics are dissolved in the solvent, painted and dried, in order to remove the solvent-containing vapor in the equipment, or make the cellophane moisture-proof, the evaporated solvent is stiffened so that it cannot easily be treated. When it is necessary to soften the solvent, by giving the moisture prior to its extraction, the solvent is directly led to the upper section of the drying tower 3 through the connecting tube 45, when the passage 17 from the preheater 16 is not connected with the finish-drying tower as shown in the dotted line in the figure. The upper and lower sections of the finish-drying tower 5 are connected with each other through the connecting tube 46. By controlling the valves 47, 48 and 49 set on the tube, the air, whose temperature, moisture and other conditions are properly adjusted by the blower 50 at the regulating section 51, is circulated, in order to remove the residual solvent. In this case, the preheated air flowing in the lower section of the feed beaks 23 and 24 is checked by the door 52 at the port 43, and led through the connection tube 44. Meanwhile, the overflowing tube 53 on the upper section of the drying chamber 4 is hung down, and its overflowing outlet 53' is lowered to the same position of the overflowing outlet 41' of the extraction tube 41 on the lower section of the finish-drying tower 5. As mentioned above, the air taken out of the extraction tube 41 or the overflowing tube 53 is small in quantity. However, as this air contains the solvent vapor, it can be recovered in another equipment by means of absorbent or it can be released into a safe place and washed away by the solvent. The letter "$h$" in the figure indicates the heating tubes of the drying tower 3, finish-drying tower 5, preheater 16, and the small-sized heater 35 for the driven air forming the film, while the letter "$c$" shows the cooling tubes of the solvent recovery tower 11 and the small-sized cooler 28 for the driven air.

The moisture in the air for the use of drying has a large effect upon the drying process. However, if the moisture content is so much as to be close to the saturation point, it would be condensed on the surface of the material to be treated, and consequently hamper the drying effect. According to the method based upon this invention, the moisture is cooled to a definite saturation point, condensed and removed with the solvent in the cooling recovery tower, although any moisture comes from the solvent-containing material. Therefore, if subterranean water is used, the moisture content is almost constant in quantity, because the cooling temperature is almost constant. In any case, however, the temperature when the water comes into contact with the material is higher than the above cooling temperature. There is, therefore, no danger of the above adverse effect upon the drying process. Above all, in case of the driven air at the material, inlet, the above effect is larger.

If gasoline is used as the solvent, and the drying process is accelerated by introducing a large amount of the steam into the drying unit, the whole air for the drying use becomes heavier, influenced by the moisture. The weight increase caused by the solvent vapor is the same, and has not influence upon its effect. If a large quantity of water is directly introduced to the drying unit, the whole content of the equipment becomes light. It would be therefore, often necessary to promote the circulation by means of a blower 18 of large capacity.

In order to prevent explosion, the solvent vapor, which has been dried and vaporized, is removed to another place as quickly as possible, and diluted. In practice, the solvent vapor is diluted more than triplefold. As the material in a drying process has a solvent liquid, and the almost saturated surface and its nearby part contain the solvent vapor, it takes a long time to dilute the air to the point below the low explosion limit. Not only that, as the wide range of the section in a drying process is above the low limit, while large power and heat are required for transferring and stirring large quantity of the air, it is, therefore, inevitable that the equipment becomes complicated and large-sized, and consequently that there are possibilities of great danger. In contrast to the above general method, the solvent vapor is contained at the point above the high explosion limit according to the method based upon this invention. Therefore, the content at the high limit is almost 3–5 times as much as that at the low limit. It would be enough that the amount of the air is $1/10$–$1/15$ of the amount of the drying air which is generally diluted more than triplefold for the safety purpose. As mentioned in the above, the circulating air coming from the recovery tower for the cooled solvent contains the solvent vapor at minimum. As the air is saturated at its temperature, it contains a large quantity of solvent vapor. In connection with the methyl alcohol which expands to the utmost at the high limit, for example, its volumetric ratio is 21.0% at the temperature of 20°–25° C. Therefore, the temperature, at which this alcohol is in a state of the saturation, is about 23° C. In practice, however, the air is saturated with moisture, and contains other non-combustible gas at this temperature. It would be, therefore, generally safe, if the air is cooled at 17°–18° C., the temperature of the underground water to about 20° C. Meanwhile, as the circulating air in the equipment is used to drive the material to the inlet as mentioned in the above, safety is not hampered.

If the treatment is conducted in such a gas as nitrogen to prevent the oxidization affected by the oxygen of the air when the vapor is heated for the drying purpose, the gas loss is small and the operation can be operated with safety, because the charged gas is not exhausted to the outside. In this case, it is favorable that the gas is lighter than the air, because the drying process in the drying unit is promoted, while there is little possibility of the gas escaping from the inlet and outlet of the material to be treated. On the other hand, if the oxygen content is reduced, the oxidization of the material to be treated can be prevented.

In connection with the prevention of the odor and poison, the solvent vapor, which is vaporized in drying operation as mentioned in the above, does not flow to the outside. The vapor overflowing from the outlet of the product is extremely small in quantity, influenced by the expansion of inside air. The vapor can therefore be evaporated and removed prior to the drying of the material.

Figure 2:
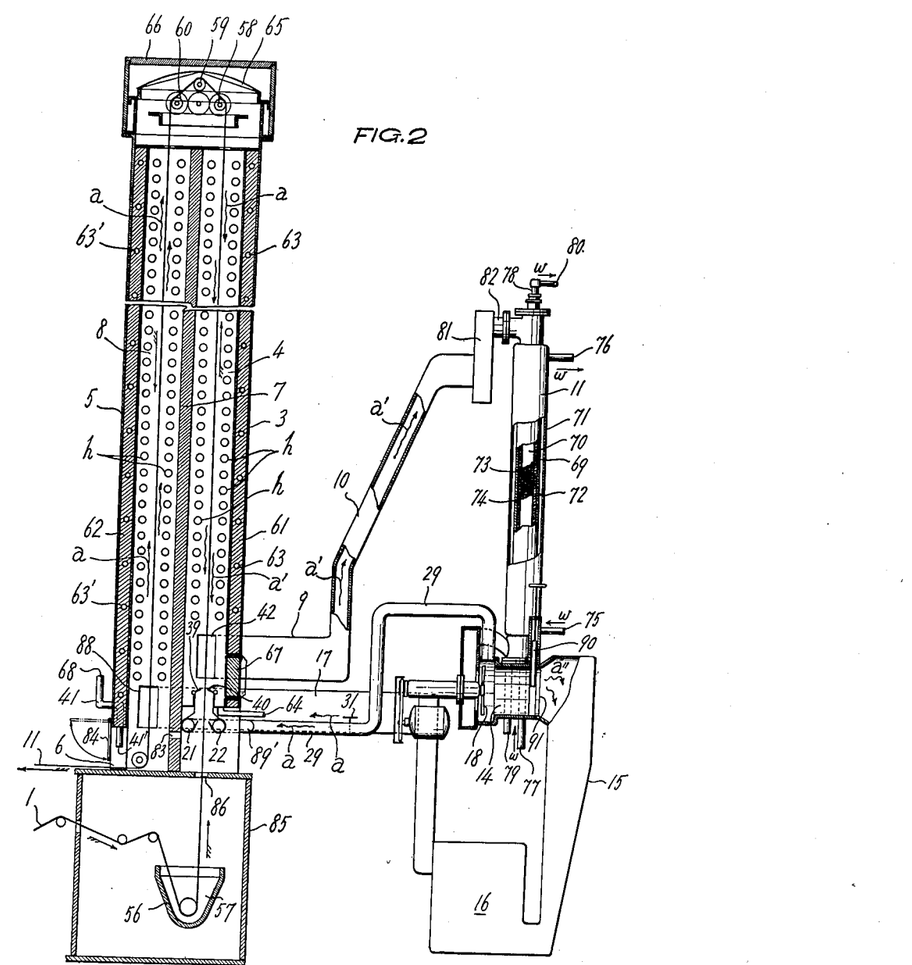
FIG. 2 shows a side view of an actual unit partially in cross-section.
Figure 3:
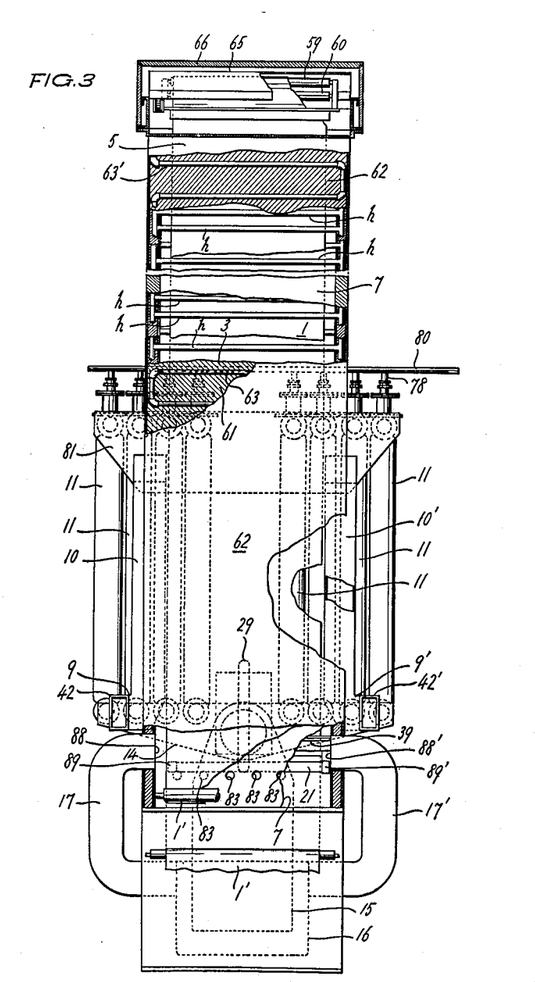
FIG. 3 is a front view of the unit.
Figure 4:
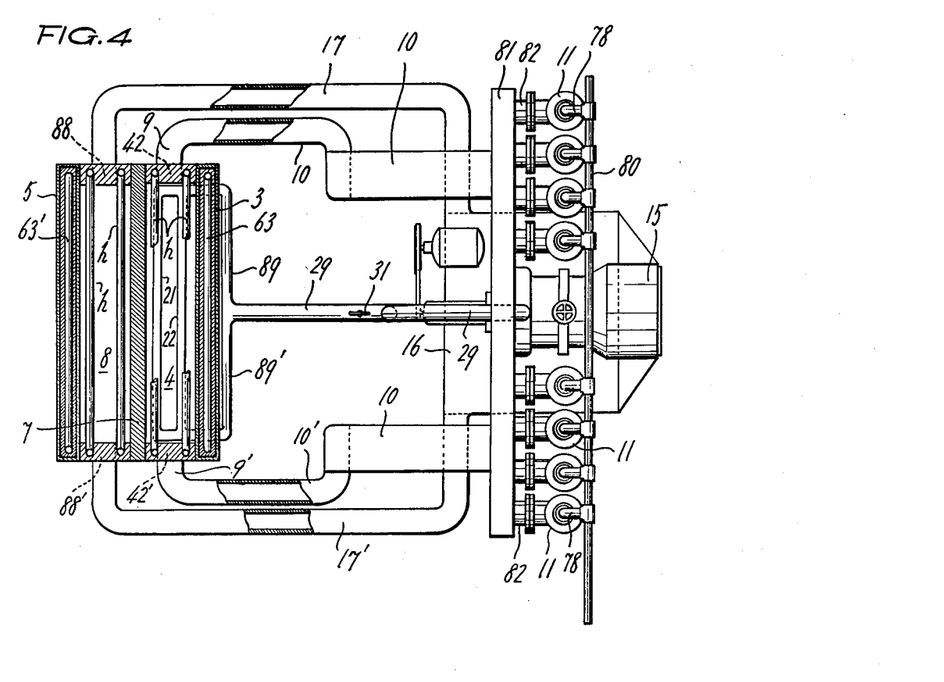
FIG. 4 is a top plan of the major equipment with the drying tower in cross-section.

The equipment in the FIGS. 2–6, are some examples of the practice based upon this invention. The solvent methanol or ethyl alcohol is evaporated and dried from the solvent-containing material such as the paper or cloth of long size which is soaked and painted with the phenol synthetic resin. The section, which is shown with the same reference numeral as that in the above example, indicates the same position. As shown in FIGS. 2, 3 and 4, a large number of the heated steam tubes $h$ are laid in the drying tower 3 and the finish-drying tower 5 so that the temperature may be as high as more than 100° C. Together with the drying effect, the maturation and condensation of the resin are stimulated, while the moisture is removed perfectly. The material 1 is painted with the solution 57 in the soaking tank 56. The solvent-containing material then ascends in the drying chamber 4, transferred by several pieces of rollers 58, 59 and 60 set on the upper section of drying tower 3, and is introduced to the drying chamber 8 of the finish-drying tower 5. In the side walls 61 and 62, the heating tubes 63 and 63' are laid not only to reduce the effect of the cold open air upon the inside, but also to prevent the solvent from condensing on the inside wall. A small quantity of the solvent liquid, which condenses on the lower section of the drying chamber 4, is taken out of the exhaust tube 64. The cover 65 on the top of the drying towers 3 and 5 is so light in weight that it can be easily removed. The lid 66 is double-laid on the cover for the heating purpose. The lid 67 on the low side of the drying tower 3 is for the inside operation use. During the operation when the upper section of the material outlet 6 under the finish-drying tower 5 is closed, an excessive amount of the air in the equipment can be taken out of the overflow outlet 42 of the exhaust tube 41. At the beginning of the operation or the cleaning of the inside, the outer port 68 can be opened.

The recovery tower 11 for the cooled solvent is so designed that the circulating air passage 69 in the tower wall 71 may be water-cooled by the inner and outer cooling water passages 70 and 72. The central cooling water passage 70 and the circulating air passage 69 amount the former are filled with the fins 73 and 74 to increase the cooling effect as well as the separation of the fog which had condensed from the solvent. The cooling water is led from the tubes 75 and 77. The water, which is led from the tube 77, comes through the central cooling water passage 70, while the water, which is led from the tube 75, comes through the outer cooling water passage 72. They come then from the tubes 78 and 76, respectively, and cool the air passage 69. It is effective that as shown in the FIGS. 3 and 4, several cooling recovery towers should be installed in an upright manner. In order to feed these recovery towers, the solvent air $a'$ is sent from the connecting port 42 of the drying tower 3 through the connecting tubes 9 and 10 to the branch box 81, from where the air is sent through the branch tube 82 to the recovery towers. If the width of the recovery towers is large, it is effective that as shown in the FIGS. 3 and 4, the connecting tubes 9, 10, 9' and 10' should be branched from both sides. The recovered solvent flows out of the exhaust tube 79, and then is recovered. After the recovery of the solvent, the air $a''$ coming from the lower section of the recovery tower is collected, and driven by the circulation-promoting blower 18 in the passage 14 into the passage 29 connecting with the drying tower 3. The dried air $a$ goes to the inlet 1 of the material. The valve 31 in the passage 29 regulates the speed and volume of the driven air.

When the damper 90 of this part is opened as occasion demands, the air goes from the passages 91 and 15 through the preheater 16, and proceeds from the connecting passages 17 and 17' to the connecting ports 88 and 88' of the finish-drying chamber 8.

Figure 5:
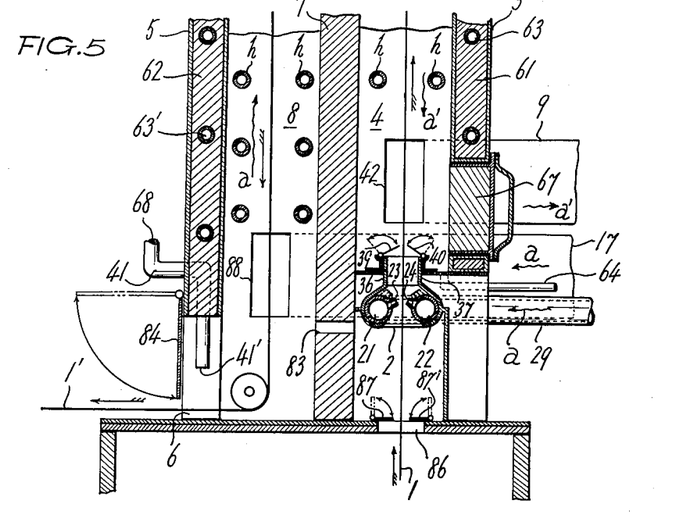
FIG. 5 is a vertical cross section of a part of the drying tower, into which the crude material is fed.
Figure 6:
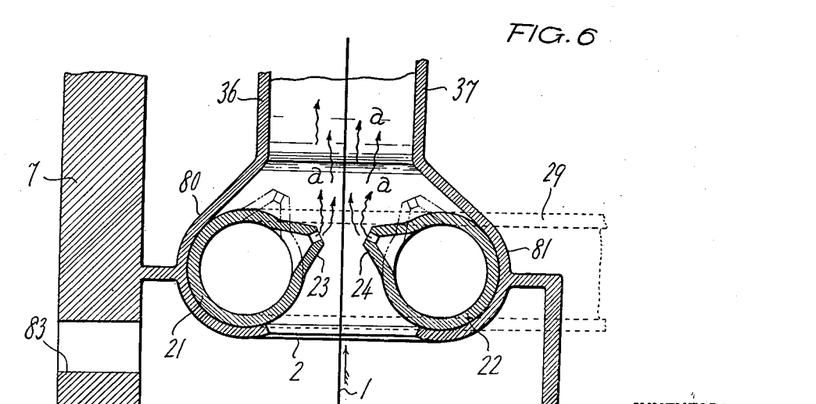
FIG. 6 is a cross section of the air lock of the latter part.

As shown in the FIGS. 4, 5 and 6, the air $a'$ driven from the recovery tower 11 goes through the passage 29, and is dried to some extent. This dried air $a$ is distributed into the branched tubes 89 and 89', and enters the beak tubes 21 and 22 from both sides of the drying tower 3. The feed beaks 23 and 24 near the material inlet 2 for the driven air face each other, and are opposed against the material 1 rising in the central section. The back sides of the beak tubes 21 and 22, where these beaks 23 and 24 are laid, are so designed that the beaks 23 and 24 may be turned in contact with the inner side of the walls 80 and 81 of the inlet 2. However, no ventilation is then allowed. The device is made so that the direction of the driven air $a$ may be adjusted or the end of the beak may be parted from the center when the material is initially introduced into the equipment. On the upper sections 36 and 37 close to the inside of the drying chamber 4, the shelter plates 39 and 40 are laid in the face of each other so that they may be opened and closed. During the operation, they promote the effect of the driven air by throttling the passage through which the material 1 rises.

On the lower section of the partition wall 7 between the drying tower 3 and the finish-drying tower 5, a port 83 is positioned on the lower part of the beak tubes 21 and 22. Even if the air $a$ coming from the feed beaks 23 and 24 branch-flows downwards or the air is introduced from the lower section, the air is led from the port 83 into the finish-drying chamber 8, and is mixed into the preheated air circulating in the chamber independently of the open air. The position of the port 83 is higher than that of the overflow port 41' of the exhaust tube 41, while the lower end of the opening and closing lid 84 at the outlet 6 is lower than the above overflow port 41'. On the other hand, the passage to the feed beaks 23 and 24 at the inlet 2 to the drying tower 3 of the material 1 is isolated from the open air by the equipment room 85 of the soaking tank 56. As the inlet 86 from the equipment room 85 is below the lower end of the above lid 84, the air above the inlet 86 does not descend as in the case of the material 1. At the above inlet 86, there are adjustable plates 87 and 87', which can be opened and closed.

In case of the above phenol synthetic resin, the inside is often heated to as high as 150°–160° C. However, as the equipment is made airtight, and only the necessary quantity of the air for the drying is used, the above temperature is easily made available, by using small quantity of lower pressure. Meanwhile, as the unreacted vapor of phenol, formalin, etc., which had been evaporated in the drying process, are mixed in, the generally used adsorbent immediately loses its effect, and consequently cannot recover the solvent easily. In the above cooling recovery tower 11, these foreign matters are washed out with the liquid such as the methanol solvent, etc. The recovery tower can therefore be used for a long time without any special trouble as the cleaning work, etc.

In the above, I have described the nature, operation and effect of my invention, by citing example of a unit based upon this invention. In addition, the equipment to be used for this operation can easily be manufactured, while not only the painting material but also the materials which are dissolved or admixed with the solvent can effectively be used.

What I claim is:

1. In a method of drying solvent containing web materials comprising passing solvent containing web material upwardly into a drying zone, concurrently therewith introducing heated drying air downwardly into said drying zone, removing said drying air from said drying zone, cooling a portion of the removed drying air thereby condensing the solvent from the drying air, separating the condensed solvent from the drying air, re-heating the drying air and recycling the heated drying air to the drying zone, compressing that portion of the removed drying air not freed of the solvent, directing the compressed air towards both side of the web material as the web material enters the drying zone thereby forming an air film on both sides of the material to prevent the drying air from escaping exteriorly of the drying zone.

2. In combination an apparatus for drying solvent containing web material comprising an elongated vertical drying chamber, said chamber having an inlet port at the bottom thereof for introduction of the web material, means for supplying drying air under pressure into the upper portion of said drying chamber, means for removing the drying air near substantially the bottom portion of said drying chamber, means located near the inlet port for providing introduction of compressed air to seal said port, means for removing the solvent contained in the drying air, means for compressing a portion of the air for introduction into means near the inlet port and means for compressing the remainder for recycling into the drying chamber.

3. In combination an apparatus for drying solvent containing web material comprising an elongated vertical drying chamber, said chamber having an inlet port at the bottom thereof for introduction of the web material, means for supplying drying air under pressure into the upper portion of said drying chamber, means for removing the drying air near substantially the bottom portion of said drying chamber, manifold means located at both sides of the web material near the inlet port for providing introduction of compressed air to seal said port, said manifold means positioned to direct the compressed air against the web material at an oblique angle, cooling means for cooling said drying air to condense the solvent contained therein, means for compressing a portion of the air for introduction into said manifold means, means for compressing the remainder of the drying air for recycling into the drying chamber and heating means for heating said re-cycled drying air prior to introduction into said drying chamber.

4. In combination an apparatus for drying solvent containing web material comprising an elongated vertical drying chamber, said chamber having an inlet port at the bottom thereof for introduction of the web material, means for supplying drying air under pressure into the upper portion of said drying chamber, means for removing the drying air near substantially the bottom portion of said drying chamber, manifold means located at both sides of the web material near the inlet port for providing introduction of compressed air to seal said port, said manifold means positioned to direct the compressed air against the web material, said manifold means being further positioned in a constructed passageway in the lower portion of said drying chamber, said passageway terminating in the upper portion thereof with adjustable baffle plates, cooling means for cooling said drying air to condense the solvent contained thereon, means for compressing a portion of the air for introduction into said manifold means, and means for compressing the remainder of the drying air for re-cycling into the drying chamber and heating means for heating said re-cycled drying air prior to introduction into said drying chamber.

5. In combination an apparatus for drying solvent containing web material comprising an elongated inverted U-shaped drying chamber, said chamber having an inlet port at the bottom of one leg thereof for introduction of the web material, means for supplying drying air under pressure into the bottom portion of the other leg of said drying chamber, means for removing the drying air near substantially the bottom portion of said drying chamber, manifold means located at both sides of the web material near the inlet port for providing introduction of compressed air to seal said port, said manifold means positioned to direct the compressed air against the web material at an oblique angle, said manifold means being further positioned in a constricted passageway in the lower portion of said drying chamber, said passageway terminating in the upper portion thereof with adjustable baffle plates, cooling means for cooling said drying air to condense the solvent contained therein, means for compressing a portion of the air for introduction into said manifold means, and means for compressing the remainder of the drying air for re-cycling into the drying chamber and heating means for heating said re-cycled drying air prior to introduction into said drying chamber.

References Cited in the file of this patent

UNITED STATES PATENTS

| | | |
|---|---|---|
| 1,189,711 | Lummus | July 4, 1916 |
| 1,513,928 | Oenslager et al. | Nov. 4, 1924 |
| 2,039,176 | Locker | Apr. 28, 1936 |
| 2,271,347 | Runals | Jan. 27, 1942 |
| 2,938,276 | Doleman et al. | May 31, 1960 |